UNITED STATES PATENT OFFICE.

CHARLES LOWE, OF REDDISH, NEAR STOCKPORT, COUNTY OF LANCASTER, ENGLAND.

MANUFACTURE OF THE DERIVATIVES OF AURIN.

SPECIFICATION forming part of Letters Patent No. 318,484, dated May 26, 1885.

Application filed March 10, 1885. (No specimens.) Patented in England November 22, 1882, No. 5,554.

*To all whom it may concern:*

Be it known that I, CHARLES LOWE, a subject of the Queen of Great Britain, residing at Reddish, near Stockport, in the county of Lancaster, England, manufacturing chemist, have invented a certain new and useful Composition of Matter for Coloring, (for which I have obtained Letters Patent in Great Britain, No. 5,554, dated November 22, 1882;) and I do hereby declare that the following is a full, clear, and exact description of the invention, which will enable others skilled in the art to which it appertains to make and use the same.

The object of my invention is to manufacture from coal-tar products a new and improved conjugated acid red coloring-matter, which I designate "roso-phenoline sulphonic acid." To effect this object I take one part aurin, known also as "yellow coralline," and heat it at a low temperature, between 100° and 212° Fahrenheit, with five parts of sulphuric acid, so as to convert it into aurin sulphonic acid, and the product obtained after separation of the excess of sulphuric acid in the usual manner well known to chemists I heat with ammonia, either in aqueous, ethylic, phenylic, or other alcoholic solution, either in open vessels at ordinary atmospheric pressure, or in closed vessels at pressures exceeding that of the atmosphere, until the coloring-matter designated by me under the name of "roso-phenoline sulphonic acid" is produced.

The ammoniacal salt of the roso-phenoline sulphonic acid thus prepared may be employed for dyeing purposes as such, or may be further purified by any of the well-known general processes applicable to the purification of sulphonic acids and their salts.

The conjugated acid red coloring-matter thus produced, and which I designate "roso-phenoline sulphonic acid," combines with ammonia or other alkali to form salts of roso-phenoline sulphonic acid in a solid or paste condition of deep-red color by transmitted light, and of green color by reflected light, which salts are insoluble in benzole, but soluble in alcohol or water, and the latter solution will produce on silk or wool in either neutral or acid baths red shades of color varying from pink to crimson.

I declare that what I claim, and desire to secure by Letters Patent of the United States, is—

The herein-described conjugated acid red coloring-matter, a derivative of aurin, which combines with alkali to form solid or pasty salts of deep-red color by transmitted light, and of green color by reflected light, said salts being insoluble in benzole, but soluble in alcohol or water, and the latter solution producing on silk or wool in either neutral or acid baths red shades of color varying from pink to crimson, as set forth.

The foregoing specification of my improvement in the manufacture of derivatives of aurin signed by me this 27th day of February, 1885.

CHAS. LOWE.

Witnesses:
H. B. BARLOW,
S. W. GILLETT.